United States Patent [19]

Riley et al.

[11] 3,905,916

[45] Sept. 16, 1975

[54] PROCESS FOR PREPARING A HYDROTREATING CATALYST

[75] Inventors: Kenneth L. Riley, Baton Rouge, La.; William T. House, Baytown, Tex.; John E. Hofmann, Berkeley Heights, N.J.

[73] Assignee: Exxon Research and Engineering Company, Linden, N.J.

[22] Filed: Apr. 26, 1973

[21] Appl. No.: 354,661

Related U.S. Application Data

[63] Continuation of Ser. No. 162,662, July 14, 1971, abandoned.

[52] U.S. Cl................ 252/453; 252/455 R; 208/216
[51] Int. Cl.............................................. B01j 11/40
[58] Field of Search.......... 208/216; 252/455 R, 458, 252/453

[56] References Cited
UNITED STATES PATENTS

| | | | |
|---|---|---|---|
| 3,509,044 | 4/1970 | Adams et al. | 208/216 |
| 3,531,398 | 9/1970 | Adams et al. | 208/216 |
| 3,668,116 | 6/1972 | Adams et al. | 208/216 |
| 3,686,095 | 8/1972 | Coons, Jr. et al. | 208/216 |
| 3,692,698 | 9/1972 | Riley et al. | 252/455 R |
| 3,770,617 | 11/1973 | Riley et al. | 208/216 |
| 3,770,618 | 11/1973 | Adams et al. | 252/455 R |

*Primary Examiner*—Delbert E. Gantz
*Assistant Examiner*—G. J. Crasanakis
*Attorney, Agent, or Firm*—Llewellyn A. Proctor

[57] ABSTRACT

An improved hydrotreating catalyst is prepared by precipitating the oxides or hydrated oxides of aluminum and silicon from an aqueous solution of water-soluble salts (a mixture of aqueous alkaline aluminate and aqueous alkali metal silicate) at 105°–120°F at a pH of 5–9.5 and at an alumina concentration, expressed as $Al_2O_3$ of 1.2–5.0 wt. percent. The precipitate is washed, impregnated with Group VI-B and Group VIII metals and the impregnated catalyst is dried. An extrudable slurry is formed and extruded; the extrudate is then dried and calcined. The hydrotreating catalyst contains an oxide of a Group VIB metal and an oxide of a Group VIII metal on an alumina support containing 1–20 wt. percent silica. The conventional spray drying step is omitted in the preparation of the present catalyst.

12 Claims, No Drawings

PROCESS FOR PREPARING A HYDROTREATING CATALYST

This is a continuation of application Ser. No. 162,662, filed July 14, 1971.

This invention relates to an improved hydrotreating catalyst as well as to the preparation and use thereof. More particularly, this invention relates to the preparation of improved hydrotreating catalysts exhibiting significantly enhanced hydrotreating activity and little deactivation in treating petroleum residuum feeds.

Hydrotreating catalysts have heretofore been employed in a wide variety of petrochemical operations such as hydrocracking, hydrodesulfurization, hydrogenation and the like. Of these, the hydrodesulfurization operation is often considered the most troublesome, especially when applied to a petroleum residuum feedstock. Such residuums contain (1) asphaltenes and other high molecular weight, aromatic structures which severely inhibit the rate of hydrodesulfurization, (2) ash-forming constituents such as metalloorganic compounds which result in catalyst contamination and interfere with catalyst regeneration and (3) a relatively large quantity of sulfur. Although hydrodesulfurization is beneficial as a means of removing these contaminants from the feedstock, low economic incentives for improved fuel oil properties and high operating costs associated with the relatively high pressure required, the high hydrogen consumption and short catalyst life have hindered the utilization of such a process.

Recently, advances in catalysis have been made which have made hydrodesulfurization more economically feasible for treating petroleum residuum. Principally, these advances have been in the areas of enhanced catalyst activity and catalyst activity maintenance. For example, C. E. Adams et al., in U.S. Pat. No. 3,509,044, describe a high activity catalyst for hydrodesulfurization of petroleum residuum consisting essentially of a cobalt salt or nickel salt with a molybdenum salt or tungsten salt deposited on a support material consisting essentially of 1 to 6 weight percent silica and 94 to 99 weight percent alumina, said support being characterized by a maximum pore volume and surface area in pores of 30 to 70 A in diameter. In U.S. Pat. No. 3,531,398, C. E. Adams et al. further emphasize the critical relationship between the presence of macropores and micropores in the catalyst, specifying that the catalyst should have a minimum of the pore volume in pores having a diameter greater than 100 A.

Catalysts meeting specific requirements have heretofore been prepared by methods wherein generally the alumina support is formed by precipitating alumina in hydrous form from a mixture of acidic reagents in an alkaline aqueous aluminate solution. A slurry is formed upon precipitation of the hydrous alumina. This slurry is concentrated and generally spray dried to provide a catalyst support or carrier. The carrier is then either (a) washed, impregnated with catalytic promotors, dried and extruded, or, (b) washed, dried to remove excess moisture, impregnated and extruded, or, (c) washed, dried to remove excess moisture, extruded, dried and then impregnated. Alumina-silica carriers can also be prepared by employing an alkali metal silicate along with the aluminate solution.

Once the alumina has been precipitated, it is generally dewatered to an extent, thereby concentrating the slurry and is then spray dried at temperatures ranging from about 200° to 2,000°F. and preferably, from about 200° to about 500°F. Spray drying has always been considered advantageous in that the support is obtained in spherical form which makes the subsequent washing and drying steps quite easy and convenient. Moreover, spray drying enhances the physical strength and integrity of the catalyst.

It has now been found that significant increases in catalyst activity and catalyst activity maintenance can be obtained by omitting the heretofore conventional spray drying step in the preparation of the catalyst. In so doing, a surprisingly different catalyst material is obtained in that the macropore volume is reduced to at least about one-half that obtained when spray drying is employed. Specifically, the macropore volume exhibited by the catalyst materials of the present invention is less than about 0.10 ml/gm. This result is entirely unexpected because the difficulties encountered in omitting the spray drying step present a real deterrent to searching in such direction for catalyst improvement. For example, the catalyst obtained by omitting the spray drying step is physically different from that heretofore obtained in that it is far less spherical and more difficult to wash. Thus, once the alumina is obtained by precipitation, it now is necessary to wash the catalyst well to remove sodium and sulfate ions which adversely affect catalyst activity. Without spray drying, filtering becomes extremely difficult and filter surface area requirements are greatly increased, thus, increasing the costs involved in obtaining the catalyst. Still further, the physical strength of the catalyst which is obtained by omitting the spray drying step is not as high as that heretofore obtained. However, these deficiencies are believed to be more than compensated for in that the resultant catalyst is considerably more active due to the decrease in macropore volume than the catalysts heretofore obtained employing spray drying.

The acidic reagents which are useful in the subject invention include mineral acids and aluminum salts of mineral acids. Typical mineral acids which are useful are hydrochloric acid, sulfuric acid and nitric acid. Aluminum salts of the aforementioned acids are also useful.

The alkaline aqueous aluminate solution which is most preferred in the practice of the subject invention is sodium aluminate. However, it is not intended to limit the scope of the invention to the use of sodium aluminate. The term "alkaline aqueous aluminate solution" is intended to include solutions of the aluminum salts of the various alkaline metals and of ammonium.

The precipitation of alumina to form the carrier for use in the catalyst in the subject invention is effected under controlled conditions, so that the resultant carrier is opaque and extrudable and has an apparent bulk density of less than 0.75 gms. per cubic centimeter and a maximum of pores having a diameter of 30-80 A. In order to achieve a bulk density and a maximum of pores with a diameter within the above range, it has been found that the precipitation of alumina should be effected at specific temperatures, within a certain pH range and at a particular concentration of alumina.

For purposes of the subject invention, a "maximum of pores" is taken to mean a surface area of at least about 190 square meters per gram measured in micropores having a diameter of from 30–80 A. The carrier of the subject invention is characterized as having at least 50 percent of its total surface area comprised of pores having a diameter of from 30–80 A. It is not meant to limit the subject invention to a "maximum of pores" within the range above 50 percent of the total surface area. Rather, it is considered that where pores having a diameter of from 30–80 A comprise more than 50 percent of the total surface area, a practical maximum of such pores has been achieved.

The precipitation must take place within specifically narrow temperature ranges to achieve an alumina particle which has the desired apparent bulk density and pore diameter and possesses the property of being opaque and extrudable. The precipitation should be effected at a temperature within the range of 105° to 120°F., or preferably between 110° to 120°F., and most preferably from 116° to 118°F.

The pH during precipitation is also critical in obtaining an alumina carrier with the desired physical characteristics. The precipitation must be effected at a pH between 5 and 9.5, and more preferably, between about 6 and about 9. Below about pH 5, precipitation is not possible, since the alumina begins to dissolve. If the precipitation is effected above a pH of about 9.5, the resultant alumina composition is glass-like in character and does not have the desired properties as to opacity, extrubility, pore diameter and apparent bulk density.

The alumina concentration, expressed as $Al_2O_3$, of the aqueous alkali aluminate solution must be between 1.2 to 5.0 percent by weight and is more preferably between 1.2 to 1.7 percent by weight. It has been found that glass-like structures, which exhibit a continuity of phase and are not suitable as extrusion catalysts result when the alumina content of the solution falls outside of the above stated ranges. Moreover, the carrier will not possess the desired opacity, pore diameter and bulk density for use in fixed-bed operations.

When an aqueous alkali silicate is added to the solution in order to form a carrier containing silica, the amount of silicate added must be controlled so that the dry carrier contains a stabilizing amount of silica equal to or less than 20 percent weight. More preferably, the amount of silica present in the carrier should be between 1 to 10 percent by weight silica, expressed as $SiO_2$, and most preferably from 5 to 8 percent silica. The most preferred silicate for use in the invention is sodium silicate. However, the term "alkali silicate" as used in this invention is intended to include the silicate salts for all of the alkali metals and of ammonium.

In a greatly preferred embodiment of the subject invention, the precipitation is effected in the presence of a compound selected from the group consisting of aldonic acids and aldonates. These compounds can be obtained by the oxidation of an aldose or in any other suitable manner. Examples of acids and salts which can be used are gluconic, galactonic, arabonic, xylonic, and mannoic. The aldonic acids exist in several forms and the invention contemplates the use of one or more of these forms of mixtures thereof. For example, the lactone forms, such as the gamma lactone form of gluconic acid can be used. Instead of employing the free aldonic acid in the preparation of the alumina composition, a salt thereof can be used, preferably the sodium salts. It will be understood, however, that the invention is not limited to the type of aldonate employed. Typical other suitable aldonates are potassium, zinc, magnesium, calcium and gluconic acid or other aldonic acids.

If gluconic acid is used, it is preferably employed in the form of an aqueous solution having a concentration of about 50 percent of gluconic acid. Commercial gluconic acid is available as a 50 percent aqueous solution containing approximately 99 percent gluconic and 1 percent glucose. Sodium gluconate is used in one greatly preferred embodiment of the invention.

The preferred proportions of aldonic acid or aldonate employed are within the range of about 0.5 percent to about 6.0 percent, calculated as gluconic acid on the total $Al_2O_3$ content. Excellent results have been obtained with the use of about 2 to about 3 percent of the aldonate, calculated as gluconic acid on the weight of $Al_2O_3$. Particularly good results have been noted when sodium gluconate has been used in amounts of about 2 to about 3 percent by weight of $Al_2O_3$.

The time of the precipitation reaction may vary over a considerable range. Preferably, the reaction is carried out in a time ranging from ¼ to 6 hours and most preferably from ¼ to 2 hours. Upon completion of the reaction, the slurry containing alumina or alumina-silica in hydrous form is concentrated, washed and dried.

In one specific embodiment of the invention, the slurry is filtered and the filter cake is carefully washed to remove dissolved salts prior to drying. Thereafter, the resulting catalyst can be impregnated by any of several methods which are well-known to the art. The resultant impregnated carrier can then be dried and extruded to yield the final desired physical form.

In a preferred embodiment of the invention, the slurry is filtered to increase the concentration of solids to approximately 4 to 7 percent by weight of $Al_2O_3$. The alumina carrier is then washed carefully to remove sodium and sulfate ions. It has been found in the present invention that by treating the alumina carrier in this manner as opposed to spray drying as has heretofore been customary, a catalyst support is obtained exhibiting a maximum of micropores, i.e., a surface area of at least about 190 $m^2$/gm. measured in micropores having a diameter in the range of from about 30 to 80 A, and a minimum of macropores having diameters greater than about 100 A. The catalyst supports of the present invention exhibiting the above described structure have been found to be considerably more active as hydrodesulfurization catalysts. The macropore volume obtained in accordance with the present invention has been found to be at least about one-half that of similar catalysts obtained with spray drying.

After washing, the wet carrier can then be impregnated with catalytic promotors before it is dried and then extruded, or it can be dried, impregnated and then extruded. For best extrusion results, the carrier or the impregnated catalyst is adjusted to a free moisture content of from about 44 to 58 percent and most preferably 48 to 54 percent by weight. If the process steps of the invention are carefully followed, excellent extrudates can be formed ranging in diameter from about one thirty-second inch to about three-sixteenths inch.

The above alumina or alumina-silicate hydrogels can be added to other prepared synthetic and semi-synthetic silica gels, alumina gels, or silica-alumina-clay hydrogel compositions in order to increase the amount of alumina or silica present during impregnation. Magnesium may also be combined with the alumina or aluminasilica carriers as desired.

The carriers discussed above are impregnated with catalytically active materials containing at least one element from Group VI B of the Periodic Table and at least one element from Group VIII. The catalytically active elements from Group VIII include iron, cobalt, nickel, palladium, platinum and the like. Of these, the most preferred for use in the subject invention are cobalt and nickel. Group VI B elements include chromium, molybdenum and tungsten.

In specifically preferred embodiments of the invention, the carriers are impregnated with combinations of elements from the group consisting of (a) cobalt and molybdenum, (b) nickel and molybdenum and (c) tungsten and nickel.

The alumina or alumina silica carriers can be impregnated by first contacting them with a solution containing a compound having elements of Group VI B, followed by contacting them with a solution containing a compound having elements of Group VIII. The reverse procedure can also be followed. The impregnation can also be conducted in a one-step procedure, as for example, by following the techniques outlined in U.S. Pat. No. 3,232,887. Other methods which are well known to the art may be used. Carriers of the invention can be impregnated by the hot slurry method, the pore volume method, the soaking technique or other suitable methods. Techniques for impregnation are well-known to those skilled in the art and need little further elaboration as to the precise method employed. The method of impregnating the carrier is not essential to the subject invention.

The finished impregnated catalysts have been found to possess superior activity and activity maintenance in such well-known processes as catalytic hydrocracking, dehydrogenation, hydrogenation, hydroforming, hydrodesulfurization, aromatization, polymerization and reforming. The preferred catalyst contains 1 to 30 percent by weight of catalytic elements based on total catalyst composition weight.

The invention will be further illustrated, but is not limited by, the following examples. Unless otherwise stated, all percentages and parts are by weight.

EXAMPLE 1

This example illustrates preparation of a typical carrier which is useful in making the catalysts of the invention.

A solution of aluminate and silicate is first prepared in the following manner: To 36 gallons of water were added 113 cc of sodium silicate (28–29 percent $SiO_2$ by weight, 1.4 specific gravity) and 5,323 cc of sodium aluminate (23.5 percent $Al_2O_3$ by weight, 1.5 specific gravity). 75 cc. of gluconic acid (48 percent concentration) were also added to the above. The alumina solids in this preparation was 1.3 percent as $Al_2O_3$.

A separate solution was also prepared containing sulfuric acid. Specifically, 850 cc of sulfuric acid (98 percent concentration) were added to 4.5 gallons of water. The mineral acid solution was added to the aluminate solution over a period of 23 minutes. After addition of acid, the temperature of the batch was 118°F. A third solution of 3.3 gallons of alum was also prepared containing 9.5 percent aluminum sulfate. The alum solution was added to the solutions of mineral acid and aluminate over a period of 19 minutes at a temperature of 118°F. The final pH of the gel slurry was 8.8.

The slurry was filtered, yielding opaque alumina particles. The filter cake was then treated with water to remove soluble salts and dried at 300°F. in a drying oven.

The carrier particles thus obtained (12,100 parts) were reslurried in water. The slurry was heated to 180°F. 412 parts of molybdenum trioxide were added to the slurry and reacted for 20 minutes at 180°F. Then 184 parts of cobalt carbonate were added to the alumina-molybdenum slurry and reacted at 180° to 200°F. for about 1½ hours. The impregnated slurry was filtered and the filter cake was flash dried to 30 percent volatile matter. The moisture content of the impregnated flash dried material was then adjusted to a 53 percent free moisture content. Excellent extrudates one-eighth inch in diameter were then prepared. These extrudates were partially dried and then calcined at 1,050°F. The catalysts obtained contained 3.75 percent CoO, 13.1 percent $MoO_3$ and 3.6 percent $SiO_2$. The physical properties of the catalyst (designated Catalyst A) obtained are listed below in Table 1. For purposes of comparison, a catalyst was prepared by the identical procedure except that upon obtaining the opaque alumina particles, the filter cake was reslurried in water and spray dried. The spray dried material was then treated with water to remove soluble salts and dried at 300°F. in a drying oven. The composition and physical properties of the catalyst obtained by spray drying are set forth in Table 1 and identified as Catalyst B.

Table 1

| Catalyst | A | B |
|---|---|---|
| Composition, Wt.% | | |
| CoO | 3.75 | 3.50 |
| $MoO_3$ | 13.1 | 12.5 |
| $SiO_2$ | 3.6 | 1.8 |
| Physical Properties | | |
| Surface Area, Sq.M./G | 311 | 267 |
| Total Pore Volume, ML/G | 0.51 | 0.51 |
| Avg. Pore Diameter, A | 65.6 | 76.4 |
| Bulk Density, G/ML | 0.73 | 0.68 |
| Catalyst Form - As Tested | 14 × 35 Mesh | 14 × 35 Mesh |
| Pore Volume in Pores with Diameters Greater than 100 A, ML/G | 0.09 | 0.17 |
| Surface Area in Pores with Diameters between 30 A and 80 A | 238 | 184 |

The micro-pore size distribution for the catalyst prepared in accordance with the present invention (A) and the identical catalyst prepared with spray drying (B) is shown in Table 2.

Table 2

CATALYST PORE SIZE DISTRIBUTION

| Percent of Pore Diameter Range | A Pore Volume | A Surface Area | B (Spray-Dried) Pore Volume | B (Spray-Dried) Surface Area |
|---|---|---|---|---|
| 600–500 A | 0.2 | 0.0 | 0.8 | 0.1 |
| 500–400 | 0.4 | 0.1 | 1.5 | 0.3 |
| 400–300 | 0.6 | 0.1 | 2.2 | 0.5 |
| 300–200 | 1.3 | 0.3 | 5.9 | 1.9 |
| 200–180 | 0.4 | 0.1 | 1.7 | 0.7 |
| 180–160 | 0.6 | 0.2 | 2.6 | 1.2 |
| 160–140 | 1.7 | 0.8 | 3.8 | 2.0 |
| 140–120 | 3.6 | 1.8 | 6.0 | 3.6 |
| 120–100 | 8.9 | 5.4 | 9.2 | 6.5 |
| 100–90 | 8.4 | 5.8 | 6.9 | 5.6 |
| 90–80 | 11.2 | 8.6 | 9.6 | 8.7 |
| 80–70 | 13.2 | 11.5 | 12.0 | 12.3 |
| 70–60 | 14.6 | 14.7 | 11.7 | 13.9 |
| 60–50 | 13.8 | 16.4 | 10.4 | 14.5 |
| 50–40 | 11.7 | 17.0 | 10.2 | 17.3 |
| 40–30 | 9.4 | 17.1 | 5.3 | 10.8 |
| 30–20 | 0.0 | 0.0 | 0.0 | 0.0 |
| 20–14 | 0.0 | 0.0 | 0.0 | 0.0 |

It can be seen that the surface area in pores with diameters between 30 A and 80 A is significantly improved; but most dramatically, the macropore volume, i.e., the pore volume in pores with diameters greater than 100 A, has been decreased to about one-half that of the catalyst prepared by spray drying.

EXAMPLE 2

This example illustrates the use of catalysts prepared in accordance with the present invention for residuum hydrodesulfurization. This example also compares the activity and activity maintenance of catalysts obtained in accordance with the present invention as compared to catalysts obtained by spray drying.

The catalyst obtained in Example 1 (Catalyst A) and the catalyst employed for purposes of comparison in Example 1 obtained by spray drying (Catalyst B) were tested for activity in a hydrodesulfurization process. The process was run at a temperature of 725°F., under a pressure of 1500 psig. The particular stock being treated was a Tia Juana Medium atmosphere residuum containing 2.17 percent sulfur, 290 ppm vanadium and 37 ppm nickel and having an API gravity of 15.9 at 60°F. The feed rate in terms of volume of feedstock per volume of catalyst per hour was 1 and hydrogen was fed at a rate of 3000 standard cubic feet per barrel.

Table 3 below summarizes the hydrodesulfurization activity exhibited by both catalysts in treating the feedstock over a period of days. It can readily be seen that both the hydrodesulfurization activity and the activity maintenance are far superior for the catalyst obtained in accordance with the present invention as compared to that obtained by spray drying.

Table 3

| Days on Oil at 1 V/Hr./V | Hydrodesulfurization Activity | |
|---|---|---|
| | Catalyst A | Catalyst B |
| 0 | 610 | 420 |
| 6 | 325 | 230 |
| 7 | 335 | 225 |
| 8 | 308 | 218 |
| 13 | 285 | 176 |
| 14 | 265 | 148 |
| 15 | 270 | 168 |
| 16 | 300 | 160 |

The catalysts of the present invention can be used for hydrotreating petroleum residuum. These catalysts are particularly useful for hydrodesulfurization of petroleum residuum in the liquid phase at temperatures ranging from about 600° to about 850°F. and pressures ranging from 500 to about 2500 psig in the presence of from about 500 to 7500 s.c.f./b. of hydrogen.

Although specific materials and conditions were set forth in the above exemplary processes in making and using the improved hydrotreating catalysts of this invention, these are merely intended as illustrations of the present invention. Various other carriers, catalysts, feedstocks and hydrotreating conditions such as those listed above may be substituted in the examples with similar results.

The process has particular application to a petroleum feedstock. The three major characteristics of a petroleum residuum other than molecular weight which distinguishes over other distillates are that residua contains (1) asphaltenes and other high molecular weight, aromatic structures which severely inhibit the rate of hydrodesulfurization, and cause catalyst deactivation, (2) ash forming constituents such as metallo-organic compounds which result in catalyst contamination and interfere with catalyst regeneration, and (3) a relatively large quantity of sulfur which gives rise to objectionable quantities of $SO_2$ and $SO_3$ upon combustion in industrial furnaces.

Other modifications of the present invention will occur to those skilled in the art upon a reading of the present disclosure. These are intended to be included within the scope of this invention.

What is claimed is:

1. Process for preparing an improved hydrotreating catalyst comprising:
   a. precipitating the oxides or hydrated oxides of aluminum and silicon from an aqueous solution of water soluble salts thereof at a temperature ranging from about 105° to 120°F., at a range of pH between about 5 and 9.5, and at an alumina concentration, expressed as $Al_2O_3$, between about 1.2 to 5.0 weight percent;
   b. washing the precipitate from step (a) to remove impurities therefrom;
   c. impregnating the washed precipitate with Group VIII and Group VI B metals;
   d. drying the impregnated catalyst from step (c);
   e. adding sufficient water to said dried, impregnated catalyst to provide an extrudable slurry;
   f. extruding said slurry to form an extrudate; and,
   g. drying and calcining said extrudate whereby an improved hydrotreating catalyst is obtained comprising an oxide of a Group VIII metal and an oxide of a Group VI B metal deposited upon a support material consisting essentially of 1 to 20 weight percent silica and the balance alumina, said catalyst being characterized by exhibiting a surface area of at least about 190 $m^2$/gm measured in micropores having a diameter of 30–80A and a pore volume less than about 0.10 ml/gm. as macropores having diameters greater than about 100 A.

2. Process as defined in claim 1 wherein said solution of water soluble salts comprises a mixture of an aqueous alkaline aluminate solution and an aqueous alkali metal silicate solution, and said oxides or hydrated oxides are precipitated upon addition to said solution of a mineral acid or an aluminum salt of a mineral acid.

3. Process as defined in claim 2 wherein precipitation is effected at temperatures ranging from 105° to 120°F.

4. Process as defined in claim 2 wherein the precipitation is effected at a pH between 5 and 9.5.

5. Process as defined in claim 2 wherein the alumina concentration, expressed as $Al_2O_3$, of said aqueous alkaline aluminate solution is between 1.2 and 1.7 percent by weight.

6. Process as defined in claim 1 wherein the precipitation is effected in the presence of a compound selected from the group consisting of aldonic acids and aldonates.

7. Process as defined in claim 6 wherein gluconic acid is employed in amounts ranging from about 0.5 to about 6.0 wt. percent, based on the total $Al_2O_3$ content.

8. Process as defined in claim 6 wherein sodium gluconate is employed.

9. Process as defined in claim 2 wherein the precipitation is effected over a period of time ranging from ¼ to 6 hours.

10. Process as defined in claim 2 wherein upon completion of said precipitation, the precipitate is, washed, impregnated with metals and then flash dried.

11. Process as defined in claim 1 wherein the Group VIII metal is cobalt or nickel.

12. Process as defined in claim 1 wherein the Group VI B metal is molybdenum or tungsten.

* * * * *